US011734534B1

(12) United States Patent
Waltereze

(10) Patent No.: US 11,734,534 B1
(45) Date of Patent: Aug. 22, 2023

(54) REDUCED SIZE OPTICAL CODE IDENTIFIERS AND METHOD OF USING SAME

(71) Applicant: JUGGERNAUT SPARK DEVELOPMENT LLC, Stevenson Ranch, CA (US)

(72) Inventor: Walter C. Waltereze, Stevenson Ranch, CA (US)

(73) Assignee: Juggernaut Spark Development LLC, Stevenson Ranch, CA (US)

( * ) Notice: Subject to any disclaimer, the term of this patent is extended or adjusted under 35 U.S.C. 154(b) by 0 days.

(21) Appl. No.: 17/963,565

(22) Filed: Oct. 11, 2022

Related U.S. Application Data

(62) Division of application No. 17/744,276, filed on May 13, 2022.

(51) Int. Cl.
*G06K 7/14* (2006.01)
*G06K 7/10* (2006.01)
*G06K 19/06* (2006.01)

(52) U.S. Cl.
CPC ....... *G06K 7/1443* (2013.01); *G06K 7/10861* (2013.01); *G06K 7/1408* (2013.01); *G06K 19/06037* (2013.01)

(58) Field of Classification Search
CPC ............. G06K 7/1443; G06K 7/10861; G06K 7/1408; G06K 7/00; G06K 7/1404; G06K 7/1447; G06K 9/06037
USPC .......................... 235/454, 439, 435, 375, 487
See application file for complete search history.

(56) References Cited

U.S. PATENT DOCUMENTS

| 10,936,173 | B2 | 3/2021 | Ubillos |  |
|---|---|---|---|---|
| 2007/0158425 | A1 | 7/2007 | Matsurra |  |
| 2008/0135326 | A1* | 6/2008 | Lou-Hsiao | G09F 27/00 181/141 |
| 2010/0102132 | A1* | 4/2010 | Droz | G06K 19/07703 235/492 |
| 2011/0090277 | A1* | 4/2011 | Pomerantz | B41J 2/04545 347/20 |

(Continued)

FOREIGN PATENT DOCUMENTS

WO 2014024122 2/2014

OTHER PUBLICATIONS

Sprout, "QR Code Minimum Size: How Small Can a QR Code Be?", Nov. 10, 2020, downloaded from "https://www.sproutqr.com/blog/qr-code-minimum-size", pp. 1-8.

*Primary Examiner* — Edwyn Labaze
(74) *Attorney, Agent, or Firm* — The Concept Law Group, PA; Scott M. Garrett; Scott D. Smiley

(57) ABSTRACT

A reduced size optical code identifier includes a transparent body having a flat bottom surface with a rounded or domed top surface that meets the bottom surface around the perimeter of the bottom surface. An optical code is provided in the body adjacent the bottom surface and is visible through the top surface. The top surface is configured to reduce reflection to facilitate optical recognition and decoding of the optical code. The body has a maximum length or diameter of about twelve millimeters or less. The identifier can be placed on an object or structure and then used to associate information with the optical code of the identifier so that the information can be retrieved using a computing device that can optically recognize the code and communicate with a remote server.

20 Claims, 17 Drawing Sheets

(56) References Cited

U.S. PATENT DOCUMENTS

2013/0163028 A1    6/2013  Klein
2017/0178211 A1    6/2017  DeLuca

* cited by examiner

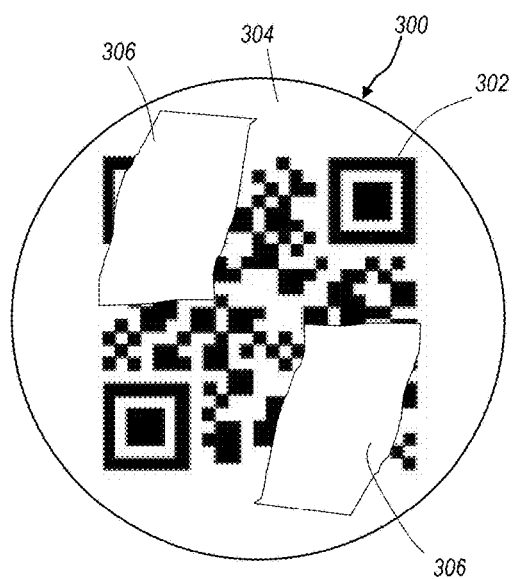
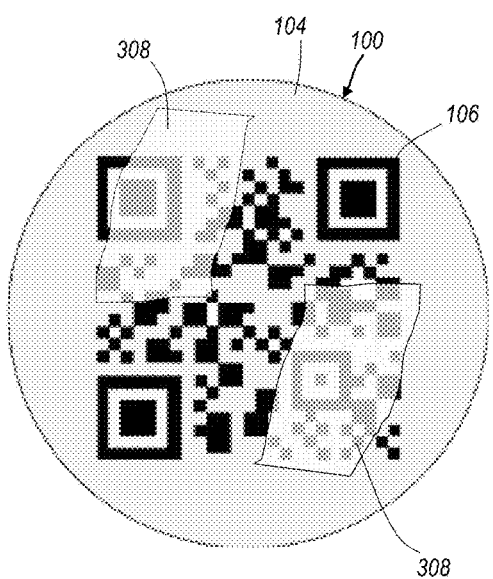
*FIG. 3A*  *FIG. 3B*

REDUCED SIZE OPTICAL CODE IDENTIFIERS AND METHOD OF USING SAME

This application is a divisional application of U.S. patent application Ser. No. 17/744,276, filed May 13, 2022, the entirely of which is hereby incorporated by reference.

FIELD OF THE INVENTION

The present invention relates generally to visual organizing aids, and, more particularly, relates to a system and method utilizing small indicia elements having optically readable codes therein which are affixed to objects, and wherein the code in the indicia element, upon being decoded by a mobile device, directs the mobile device to information about the object that is stored and accessible online.

BACKGROUND OF THE INVENTION

There are a large number of tracking and identifier systems currently in use that allow people to identify objects. Such a system is described, for example, in U.S. Pat. No. 10,296,537, which described a key identifier system using indicia elements having unique graphical indicia that are affixed to keys. In another example of using optical codes, businesses commonly use "quick response" or QR codes to direct people to a website location that contains information. QR code reading applications are commonly available for various smartphone operating systems. For example, it is common for restaurants to provide "no touch" menus by placing a printed QR code on their tables that, when read by the QR code reader application program, direct the phone's browser to a web address that provides a copy of the restaurant's menu that is then displayed on their phone. One problem with QR codes is that they tend to be relatively large, and printed materials are subject to wear and damage that defaces the code. Their size tends to preclude them from being used in certain applications, and for tracking or identification systems, the fact that they can be worn or damaged to the point of being unreadable could lead to an inability to identify the object to which they are affixed.

Therefore, a need exists to overcome the problems with the prior art as discussed above.

SUMMARY OF THE INVENTION

In accordance with some embodiments, there is provided a reduced size optical code identifier that includes a body having a back surface and a top surface. The back surface is flat and planar and has or otherwise defines a perimeter around its outer periphery. The top surface extends over the body and generally has a domed shape, and the top surface meets the bottom surface at the perimeter around an entirety of the perimeter. The body is made of a transparent material, with the top surface being anti-reflective. There is a visual code disposed in the body adjacent the bottom surface and facing toward the top surface. The body has a distance across the bottom surface, from one side to a directly opposite side, that not more than twelve millimeters.

In accordance with a further feature, the top surface is matte.

In accordance with a further feature, the bottom surface is circular.

In accordance with a further feature, the bottom surface has a diameter of about four millimeters, and the body is about one millimeter thick at a middle of the body from top surface to the bottom surface.

In accordance with a further feature, the visual code is disposed in a square having sides of about three and half millimeters and centered over the bottom surface.

In accordance with a further feature, the top surface is a spherical segment centered over the bottom surface and having a radius of about six millimeters.

In accordance with a further feature, the body further includes a layer of adhesive disposed on the bottom surface of the body.

In accordance with a further feature, the top surface meets the bottom surface around the perimeter of the bottom surface at an angle of forty five degrees or less.

In accordance with some embodiments, there is provided a reduced size optical code identifier that includes a body having a back surface and a top surface. The back surface being planar and having a perimeter, and the top surface extends over the body and meets the bottom surface at the perimeter of the back surface around an entirety of the perimeter of the back surface. The body is made of a transparent material, with the top surface having an anti-reflective treatment. The body includes an optical code disposed in the body adjacent the bottom surface and facing toward the top surface.

In accordance with a further feature, the top surface is non-glossy.

In accordance with a further feature, the bottom surface is circular.

In accordance with a further feature, the bottom surface has a diameter of about four millimeters, and the body is about one millimeter thick at a middle of the body from top surface to the bottom surface.

In accordance with a further feature, the visual code is disposed in a square having sides of about three and half millimeters and centered over the bottom surface.

In accordance with a further feature, the top surface is a spherical segment centered over the bottom surface and having a radius of about six millimeters.

In accordance with a further feature, the bottom surface has a maximum length from one side to an opposite side of twelve millimeters and a minimum length of four millimeters.

In accordance with a further feature, the body further includes a layer of adhesive disposed on the bottom surface of the body.

In accordance with a further feature, the top surface meets the bottom surface around the perimeter of the bottom surface at an angle of forty five degrees or less.

In accordance with some embodiments, there is provided a method that includes providing a reduced size optical code identifier having a body. The body has a back surface and a top surface, with the back surface being planar and having a perimeter, and the top surface extending over the body to meet the bottom surface at the perimeter of the back surface around an entirety of the perimeter of the back surface. The body is made of a transparent material with the top surface being non-glossy, and includes an optical code disposed in the body adjacent the bottom surface and facing toward the top surface. The method further includes affixing the reduced size optical code identifier to an object, and capturing a first image of the reduced size optical code identifier using a computing device. The computing device operating under control of an application program and operating in a first mode. The method further includes the computing device decoding the optical code, and in response to decoding to optical code, the computing device receiving, from a user, information about the object. The method further includes, in response to receiving the information, the computing device transmitting a record including the information and the optical code to a remote server. The method further includes the remote server receiving and storing the information.

In accordance with a further feature, the method further includes, subsequent to storing the information, capturing a second image of the reduced size optical code identifier using the computing device, wherein the computing device operates under control the application program operating in a second mode. The method further includes the computing device decoding the optical code, and the computing device transmitting the optical code to the remote server. The method also includes, in response to transmitting the optical code to the remote service, the computing device receiving from the remote server a copy of the record including the information. The method further includes the computing device displaying the information on a graphical display of the computing device.

In accordance with a further feature, providing the reduced size optical code identifier includes providing the reduced size optical code identifier wherein the body has a maximum length of twelve millimeters. Capturing the first image of the reduced size optical code identifier using the computing device is performed with a camera lens of the computing device being located at least three feet away from the reduced size optical code identifier. The method further includes the computing device using an automated zoom process to identify the optical code.

Although the invention is illustrated and described herein as embodied in a reduced size optical code identifier and a system for using the same, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 3A and 3B show top plan views of reduced size optical code identifiers having gloss and non-glossy top surfaces, respectively;

DETAILED DESCRIPTION

Figure 1:
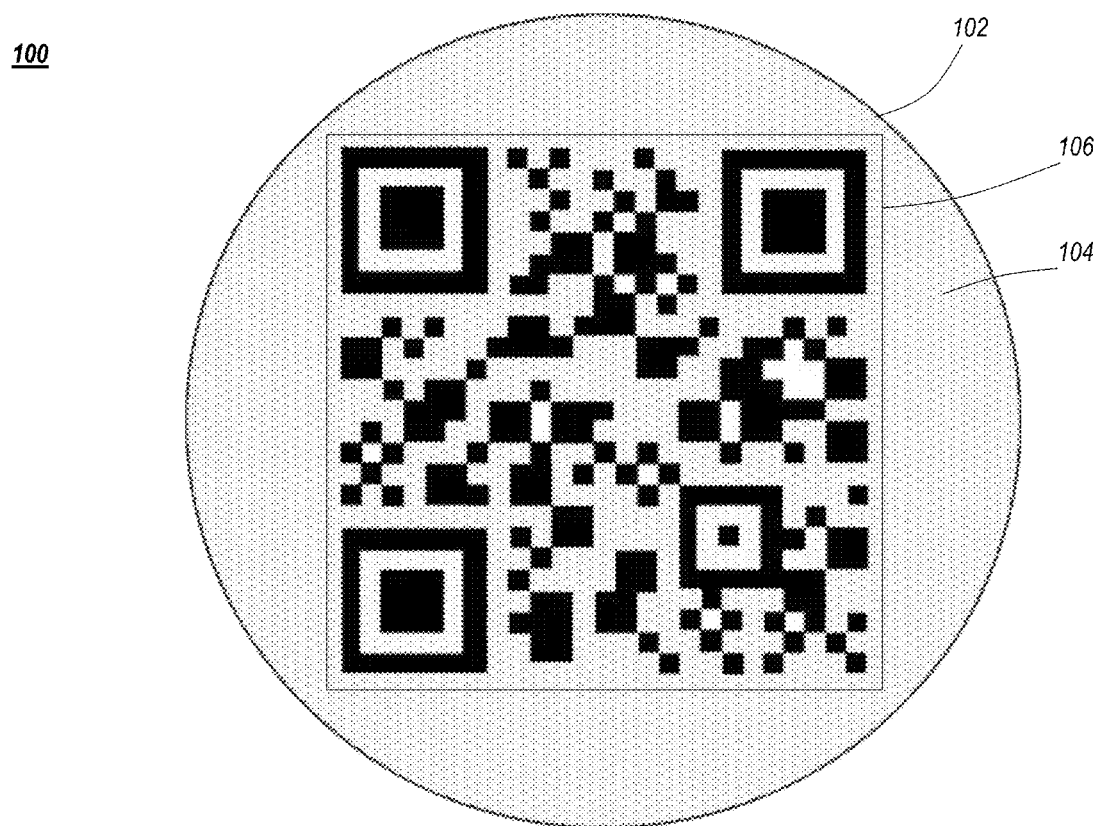
FIG. 1 is a top plan view of a reduced size optical code identifier, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present inventive disclosure provides a novel and efficient reduced size optical code identifier that includes a rigid, transparent body that is adapted to resisting being dislodged by impact or other force acting on the body relative to the object or structure to which it is mounted, and which facilitates optical recognition at both close and distant ranges relative to conventional optical code recognition distances by reducing the effect of light reflections at the surface of the identifier.

FIG. 1 is a top plan view of a reduced size optical code identifier 100, in accordance with some embodiments. As used herein, the term optical code identifier refers to an object having a machine readable optical code provided. By machine readable, it is meant that the code can be optically recognized using image processing by a machine, such as, for example, a digital camera or any device having a digital camera. More particularly, it is well known to provide mobile devices (e.g. "smartphones") with a camera system with which the camera can process the output of an image sensor to provide photos and video. Commonly, when the camera is enabled, a live image is shown on a display of the device where the live image is a continuous output of the image sensor that is essentially video output of whatever the camera is aimed at presently, as opposed to playback of a stored video file. Optical codes are in widespread use and most commonly take the form of Universal Product Codes or more commonly "bar codes," and more recently "quick response" or QR codes have also become popular. Optical codes are typically printed onto an object to identify the object upon the optical code being read by a machine. Being printed, they are subject to wear and degradation. Furthermore, many industry sources suggest that the minimum practical size for a QR code is two centimeter by two centimeters, and that the optimum distance for reading a QR code is considered to be ten times the width of the QR code. Smaller QR codes can be used, down to one centimeter by one centimeter, by removing information and reducing error correction. However this may not be suitable for many applications.

Figure 2:
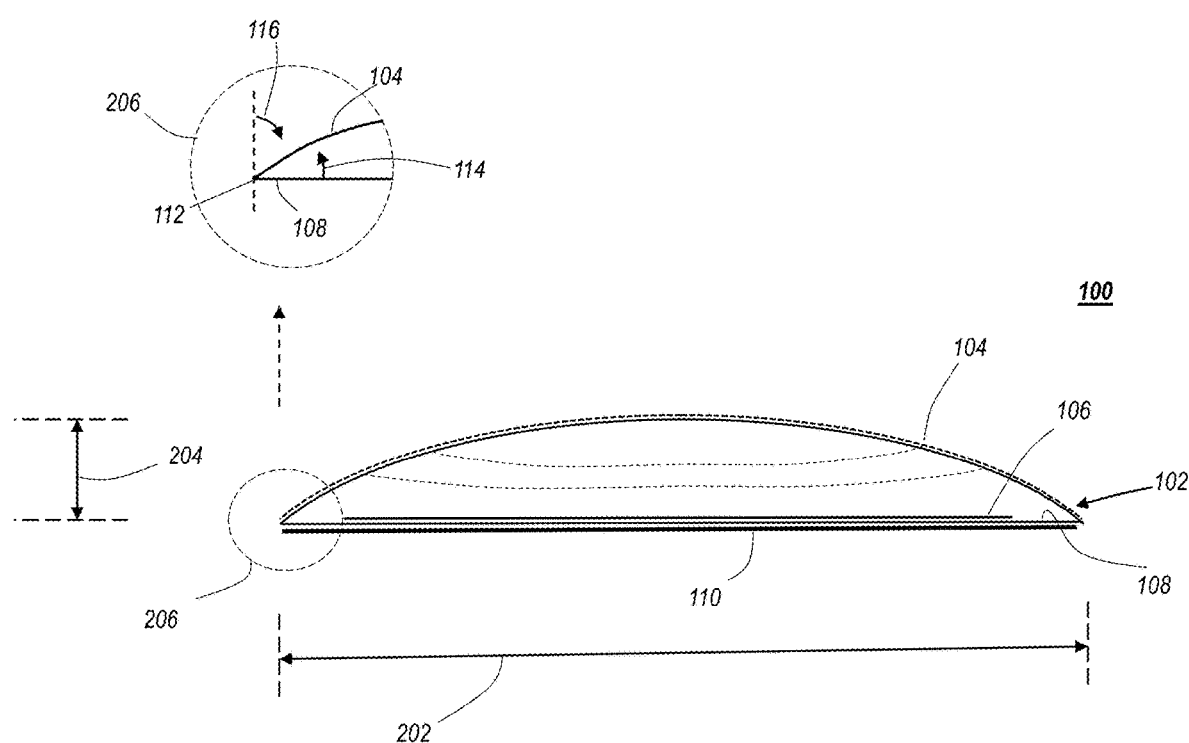
FIG. 2 is a side elevational view of a reduced size optical code identifier, in accordance with some embodiments.

Referring now to both FIG. 1 and FIG. 2, which shows a side view of the identifier 100, the reduced size optical code identifier 100 is a small object that includes an optical code 106, and that can be affixed or attached to another, larger object to allow identification of the object to which is it attached. The identifier 100 includes a domed body 102 having a top surface 104, and a back surface 108 on which the optical code 106 is disposed inside the body 102. The body 102 can be made of a generally transparent rigid material, such as any of various polymeric materials, including, for example, acrylic. The body 102 of the identifier 100 is reduced size. For example, the identifier 100 is shown as being circular, and will have a diameter 202 on the order of 1.2 cm or less. In some embodiments, a circularly configured identifier can have a diameter in the range of 0.5-1.2 centimeters. The optical code 106 can be a QR code having a dimension in the range of 4.0 mm-11 mm. The domed body 102 can have a central height 204 that is about one quarter of the diameter. The outside of the back surface 108 can have a layer of adhesive 110 for affixing the identifier 100 to another object. The top surface 104, being a sector of a sphere centered over the back surface 108, meets the back surface 108 at the periphery or perimeter 112 of the back surface 108, at an angle 114 of around fifteen to forty degrees. As a result, the body 102 lacks a sidewall, which would be a substantially vertical surface at about ninety degrees to the plane of the back surface 108. The angle 114, as seen in magnified portion 206, can be less than the complementary angle 116 from a line perpendicular to the plane of the back surface 108 to the top surface 104 to minimize optical distortion of the optical code 106 when viewed through the top surface 104, and also to resist force from other objects against the top surface that might remove the identifier from the object to which it is attached. In other words, without a sidewall, the body 102 is less likely to experience forces being exerted against the body 102 from other object. If the edge of the identifier presented a sufficient side surface, it would be more likely to catch on other objects, resulting in the identifier 100 being pulled from, or pushed off the object to which it is attached. The optical code 106 of the identifier 100 is used to associate information with the code or identifier contained in the optical code 106, such as in a database that can be accessed via a network (e.g. the Internet). Thus, a mobile device can be configured with an application program that uses the camera system of the mobile device to read the optical code, transmit the code to a remote server, wherein the server uses the received code to fetch a record from a data store and return the record to the requesting mobile device, whereupon the mobile device can then display information contained in the record that identifies the object to which the identifier 100 is attached, and provide additional information about the object, if such additional information is available.

Given that the size of the identifier 100 is a reduced size from that is commonly used, an optical reading device, such as a mobile device, will have to be quite close to the identifier 100, which can trigger the light or flash of the mobile device to engage, casting a bright light on the identifier 100. If the top surface 104 is glossy, then there can be considerable reflection of light from the top surface which can interfere with the ability of the reading device to recognize and decode the optical code 106. Thus, to prevent such optical interference, it has been found that making the top surface 104 to be non-glossy greatly increases the ability of the reading device to recognize and decode the optical code 106 through the top surface 104. The effect is shown in FIGS. 3A and 3B, which show top plan views of reduced size optical code identifiers having glossy and non-glossy top surfaces, respectively. FIG. 3A shows an identifier 300 that has a glossy top surface 304, but which is otherwise substantially similar to that of FIGS. 1-2, and includes an optical code 302. From the view of camera that is attempting the read the optical code, the top surface 304, being glossy, presents reflections 306 that wash out portions of the optical code 302, preventing the optical code 302 from being read. In FIG. 3B, identifier 100 is shown with its non-glossy top surface 104 being read under identical conditions as in FIG. 3A. Reflections 308, are produced, but because the top surface 104 is non-glossy, less light is reflected, allow the portions of the optical code that are under the reflections to be seen and recognized. The non-glossy top surface 104 can be created by molding the body 102 of the identifier using a mold that has a sufficiently rough or simply non-polished surface to form the top surface 104. In some embodiments a chemical can be applied to the top surface 104 to de-gloss the top surface 104, such as a solvent that interacts with the material of the body 102. The top surface 104 is essentially what could be described as hazy; it is still quite possible to view through the top surface 104 and see the optical code 106, but the top surface 104 is rough enough to substantially reduce the amount of light that is reflected from the top surface 104 to not optically obscure the optical code 106. In general, the magnitude of specular reflection is reduced by the surface 104, and the scattered reflection of the surface 104 is increased compared to a glossy surface (e.g. 304).

Tests for determining and specifying gloss are indicated, for example, in the American Society of Testing and Materials specification ASTM D523. A glossy surface has a uniform reflection where nearly all of the light incident on the surface is reflected at the same angle as the angle of incidence, while a scattered reflective surface results in a distribution (e.g. bell curve) of light at various angles relative to the angle of incidence. The amount of scatter needed can depend on the material of the body 102, as well as the dimensions (diameter, height), but are readily determinable by simple experiment. In some embodiments the top surface 104 can produce diffuse reflection (also known as Lambertian reflection) in which some light is reflected back to the test source at higher test angles of test incidence (e.g. 20 and 60 degrees), while still allowing light incident on the optical code 106 to reach the code reader, such the camera of a mobile device.

Accordingly, the reduced size optical code identifier 100 can allow for very small optical codes, even on the order of less than half a centimeter, to be easily read through the top surface of the identifier by reducing the reflectivity of the top surface so that when the code reader is held close to the identifier reflections of light from light on the code reader or ambient light sources will not create reflections that obscure the optical code. By placing the optical code inside the body of the identifier, it is protected from wear and weathering that would otherwise degrade the legibility of the optical code. Further, the body of the identifier, being domed and having a relatively small angle between the top and back surfaces at the edge/perimeter of the identifier, the identifier is resistant to being dislodged from the device to which it is attached by arbitrary impact or force incident on the body of the identifier.

Figure 4:
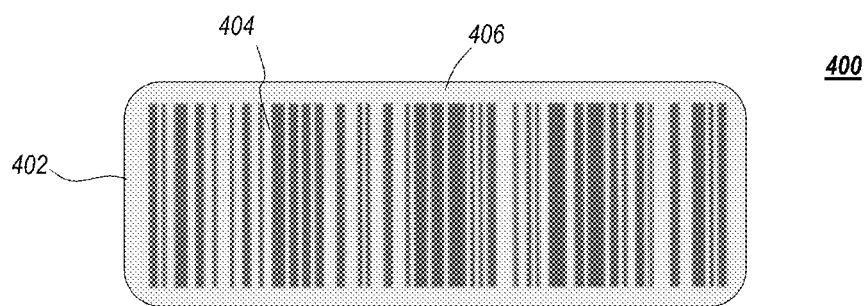
FIGS. 4 and 5 show top plan views of reduced size optical code identifiers having a non-circular perimeter, in accordance with some embodiments.
Figure 5:
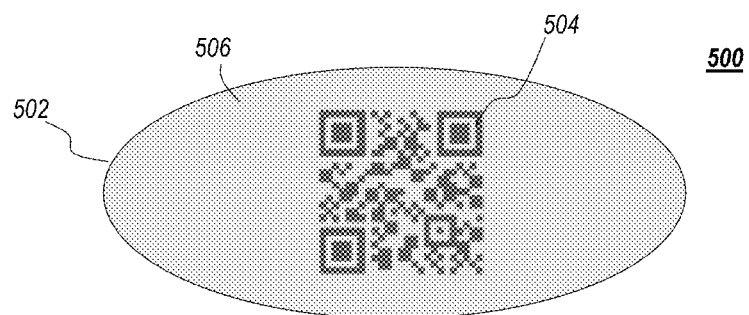

FIGS. 4 and 5 show top plan views of reduced size optical code identifiers 400, 500, respectively, having a non-circular perimeter, in accordance with some embodiments. Identifier 400 uses a UPC bar code optical code 404, and identifier 500 uses a QR code 504. Each of the identifiers 400, 500 have a body 402, 502, and a nonglossy top surface 406, 506. The top surfaces 406, 506 are domed, conforming to the particular geometries of the body perimeters, but having a maximum height generally in the center of the body, and angle between the top and bottom surfaces at the perimeter is on the order of forty degrees or less, and preferably in the range of fifteen to thirty degrees. The angle may vary around the perimeter, as well. For example, in identifier 500 of FIG. 5, the angle between the top and bottom surfaces at the left and right sides of the identifier 500 in the drawing can be smaller than at the top and bottom sides of the identifier 500 in the drawing as there is less distance between those sides than between the sides on the left and right sides of the drawing. In general, the bottom surface can have a length, defined as from one side to an opposite side through a center of the bottom surface in the plane of the bottom surface, of between four and twelve millimeters.

Figure 6:
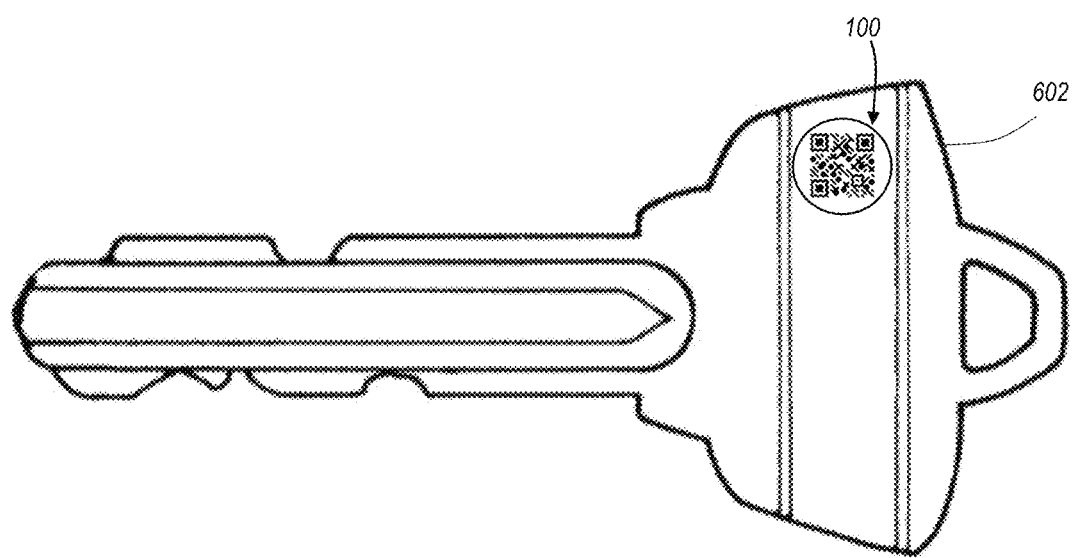
FIG. 6 shows a plan view of an ordinary key having a reduced size optical code identifier affixed thereto, in accordance with some embodiments.
Figure 7:
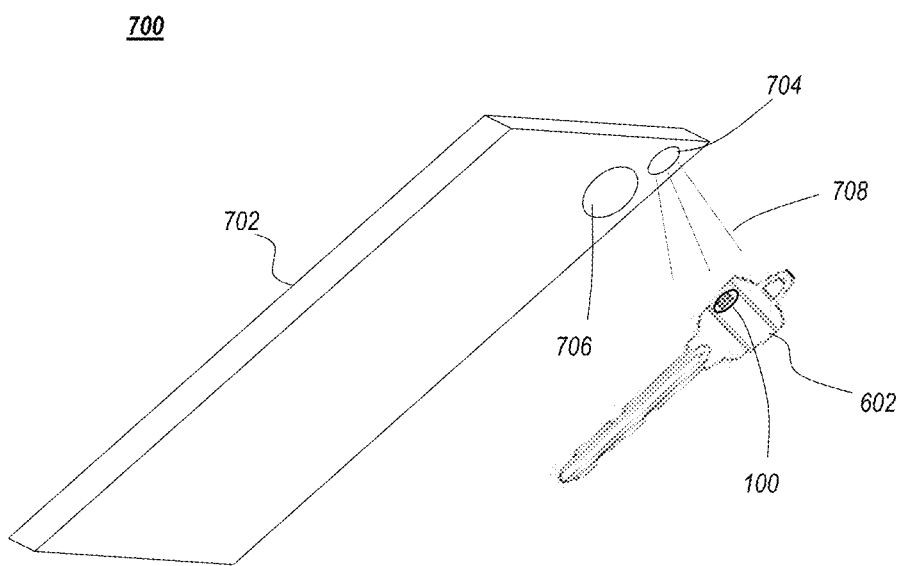
FIG. 7 shows the use of a mobile device to read the optical code in the reduced size optical code identifier at a close range, in accordance with some embodiments.

FIG. 6 shows a plan view of an ordinary key 602 having a reduced size optical code identifier 100 affixed thereto, in accordance with some embodiments. The key 602 is an ordinary key such as those used for door locks. The identifier 100 includes a unique optical code in the form of a QR code, and is configured as shown in FIGS. 1 & 2. In the present example, the identifier 100 has a circular perimeter having a diameter on the order of four to five millimeters. The key 60 can be one of a plurality of keys owned or used by a person or an organization, with each one the plurality of keys having a similar identifier affixed to it, and each of the identifiers having an optical code that is unique to that particular identifier. Thus, each key has its own unique optical code that can be used to identify the particular key. In FIG. 7 a mobile device 702 is used to read the optical code of the identifier 100 on key 602. The mobile device can be, for example, a mobile smartphone device, a tablet computing device, or some other computing device capable of optically recognizing the optical code of the identifier 100. The mobile device 702 includes instruction code for an application program that is performed by the mobile device 702 in response to user input and control. The mobile device further includes a camera system 706 and a light 704. In order the read the optical code of the identifier 100, and given that the conventional optimum distance is about ten times that of the width of the optical code, the camera system 706 would be about four to five centimeters from the identifier 100. At that range, light emitted from the light source 704, if it were to automatically be enabled would be so bright that reflections on a glossy surface could obscure portions of the optical code form the perspective of the camera lens. Additionally, light from ambient sources in the vicinity could also create reflections on the surface of the identifier 100 that prevent the camera system 706 from being able to see the optical code on the identifier 100 if the top surface of the identifier 100 were glossy. However, making the top surface non-glossy, and creating diffuse reflection, allows for the optical code to be recognized through reflection because the non-glossy surface reduces the intensity of the light being reflected to the camera.

Figure 8:
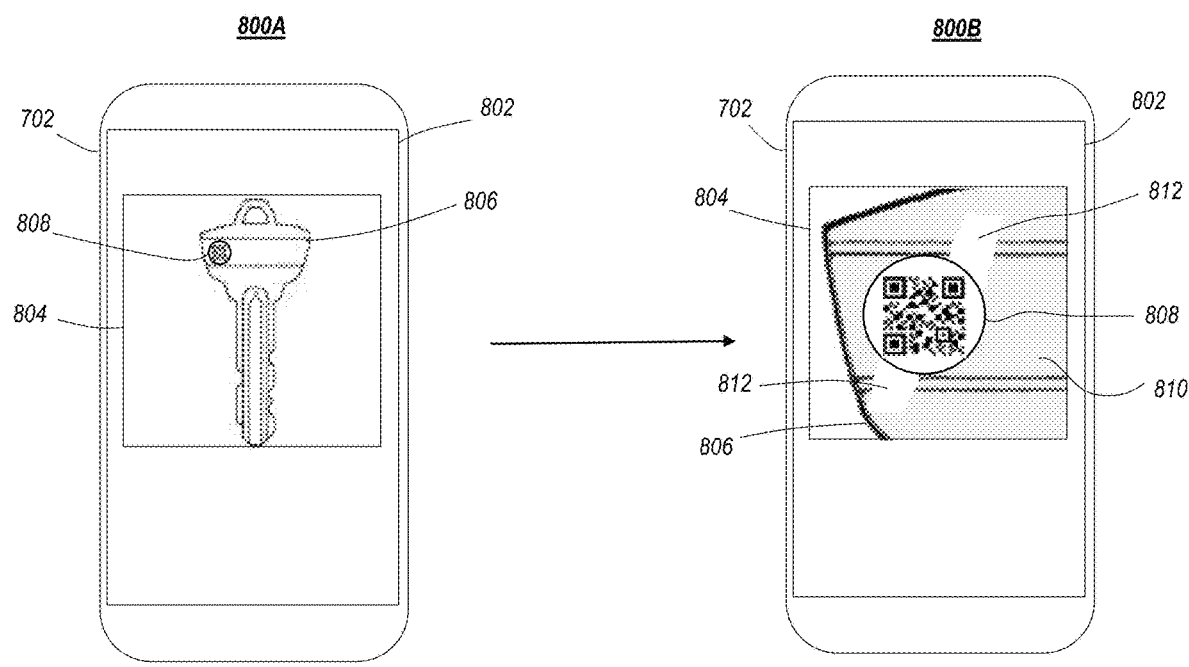
FIG. 8 shows a display of a mobile device when being used to read the optical code of a reduced size optical code identifier in first position and then in a second, closer position, wherein the non-glossy surface of the reduced size optical code identifier prevents reflection that would otherwise interfere with recognizing the optical code, in accordance with some embodiments.

FIG. 8 shows a display of a mobile device when being used to read the optical code of a reduced size optical code identifier in first position and then in a second, closer position, wherein the non-glossy surface of the reduced size optical code identifier prevents reflection that would otherwise interfere with recognizing the optical code, in accordance with some embodiments. Specifically, FIG. 8 shows the mobile device 702 of FIG. 7, while the camera 706 is aimed at the key 602, in two states 800A and 800B. Further to the features shown in FIG. 7, the mobile device 02 includes a graphical display 802. An application program used to recognize optical code is instantiated on the mobile device 702 and has access the camera system's image sensor to provide a live image on the graphical display, and the application program is actively attempting to recognize an optical code in the data of the live image. In some embodiments the application program may define a target window 804 in the graphical display that is a subsection of the live image in which the application program attempts to locate a pattern correlation of an optical code.

In 800A the camera 706 is aimed at the key 602, and as a result, the live image on the graphical display depicts an image 806 of the key 602, including an image 808 of the identifier 100. However, the mobile device 702 is too far from the key 602 for the optical code of the identifier 100 to be recognized. Thus, in 800B, the mobile device 702 is moved closer to the key 602, such that the image 808 of the identifier 100 is substantially larger in the view area, and the application program can then recognize the optical code in the image data. Due to the closeness of the mobile device to the key, small reflection can become much more dominant in the live image. However the non-glossy top surface of the identifier 100 helps to reduce their effect. For example, image portions 812 can be produced by reflections of a light source or sources that are reflected by the surface of the key 602, but the reflections do not extend over the top surface of the identifier 100 because it is non-glossy. As a result, the entire optical code can be recognized in the live image data and decoded. Upon being decoded, the application program and transmit the code to a server via a communications network and receive information about the key in response from the server. The information can indicate or described the door or lock that the key fits and can lock/unlock, such information having been previously stored in a data store associated with the server previously.

Figure 9:
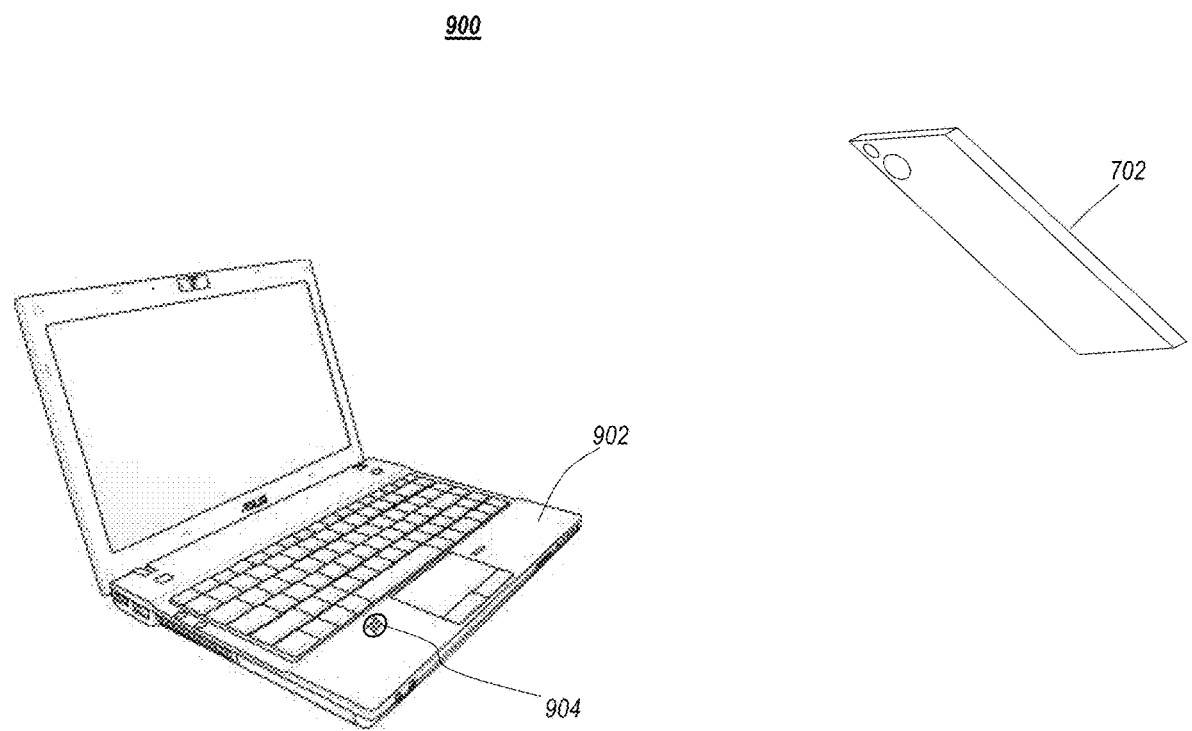
FIG. 9 shows the use of a mobile device to read a reduced size optical code identifier at a distance, in accordance with some embodiments.
Figure 10:
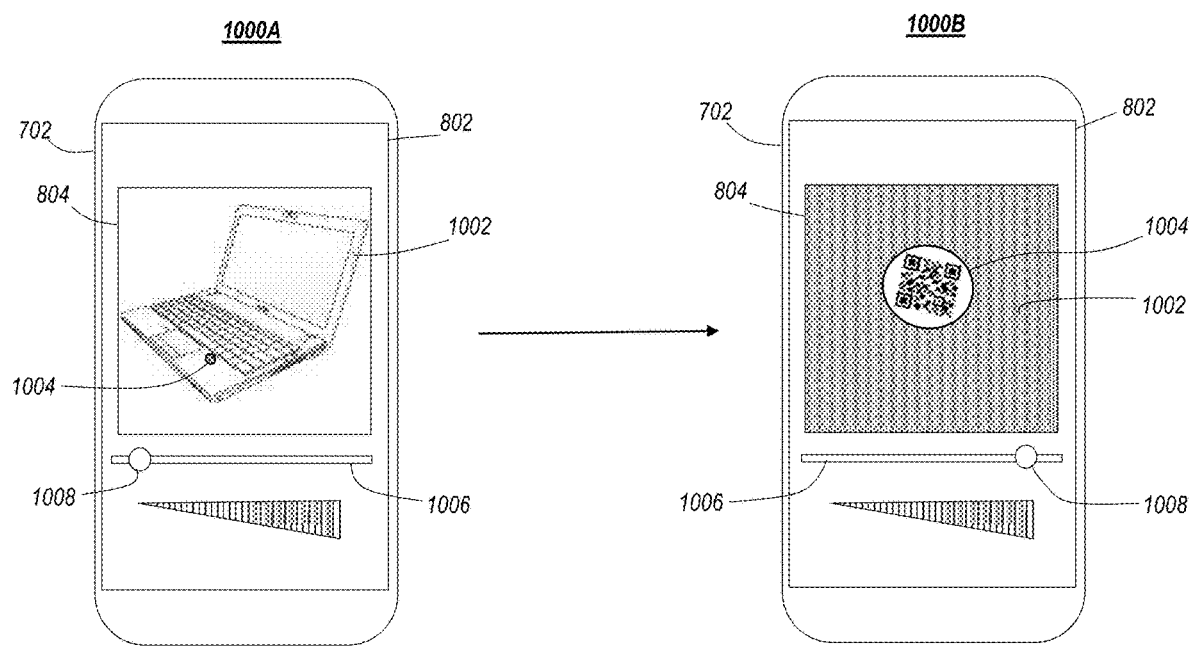
FIG. 10 shows a progression of using a manual zoom on a mobile device to zoom into a portion of a live image including a reduced size optical code identifier so that the optical code can be recognized and decoded, in accordance with some embodiments.

FIG. 9 shows the use of a mobile device 702 to read a reduced size optical code identifier 904 at a distance, in accordance with some embodiments. In the present example, the identifier 904 is affixed to laptop computer 902. Again, for the sake of example, the identifier 904 can be on the order of twelve millimeters in diameter (or length) or less. Further, the mobile device 702 is positioned several feet away from the laptop computer 902. In some embodiment the mobile device can be at least three feet from the identifier 904. FIG. 10 shows a progression of using a manual zoom on the mobile device 702 to zoom into a portion of a live image of the laptop 902 including identifier 904 so that the optical code can be recognized and decoded. Again, two states are shown, 1000A and 1000B. In 1000A the mobile device 702 is positioned to aim the camera of the mobile device 702 towards the laptop 902. As a result, an image 1002 of the laptop, including an image 1004 of the identifier 904 appears on the graphical display 802 of the mobile device 702 in the target window 804 provided by the application program. The application program also provides graphical user interface elements to operate a zoom function of the camera, including a track 1006 and a slider 1008, which are both graphical elements displayed by the graphical display 802. The graphical display 802 can include a touch input system that senses a user's finger against the display 802, and movement of the user's finger. Thus, a user can put their finger on the slider element 1008 and drag their finger along the track on the display to cause the application program to move the slider and adjust the zoom setting of the camera at the same time, thereby adjusting what is shown in the live image on the display 802. Accordingly, the user can, in 1000A aim the camera at the laptop 902, and zoom in to the identifier, resulting in the image in state 1000B, where the optical code of the identifier is then large enough that the optical code can be recognized and decoded. In this example, the mobile device does not need to be at the commonly recommended distance from the identifier 904 (e.g. ten centimeters), and instead, the application program allows the user to magnify the image of the identifier using the camera's zoom function. Again, because there can be ambient light sources, the non-glossy top surface of the identifier 904 prevents undue reflection that could otherwise interfere with recognizing the optical code, particularly at such an extended distance.

Figure 11A:
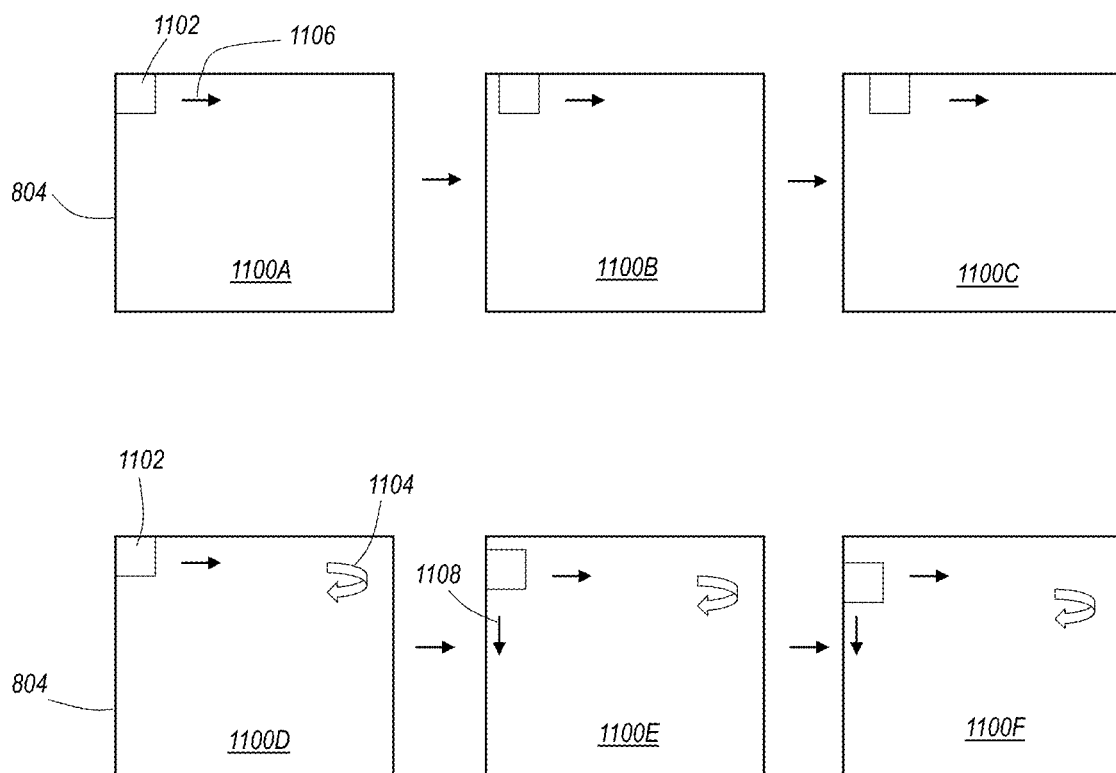
FIG. 11A shows a series of magnifying mask locations in an automated search in a live image on a mobile device for a reduced size optical code identifier, in accordance with some embodiments.
Figure 11B:
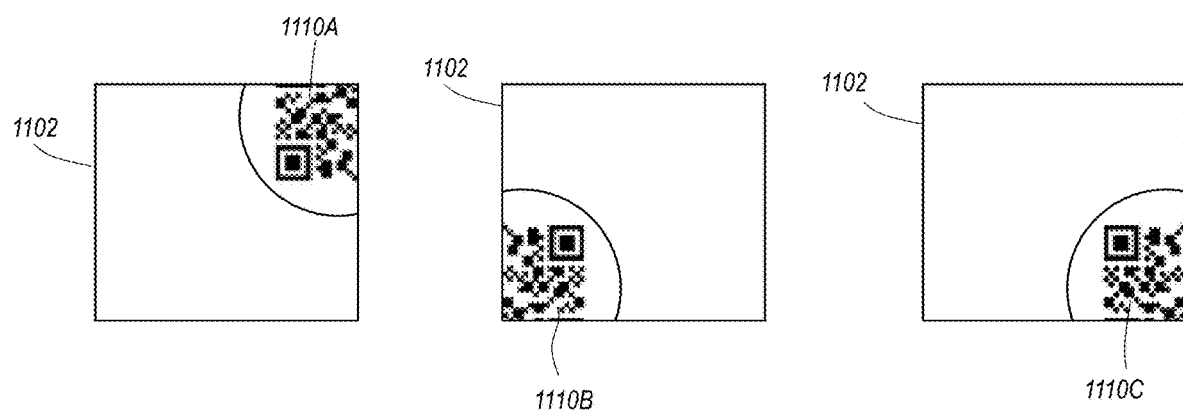
FIG. 11B shows various examples of a reduced size optical code identifier appearing in a magnifying mask during an automated search of a live image on a mobile device for pattern recognition, in accordance with some embodiments.
Figure 12:
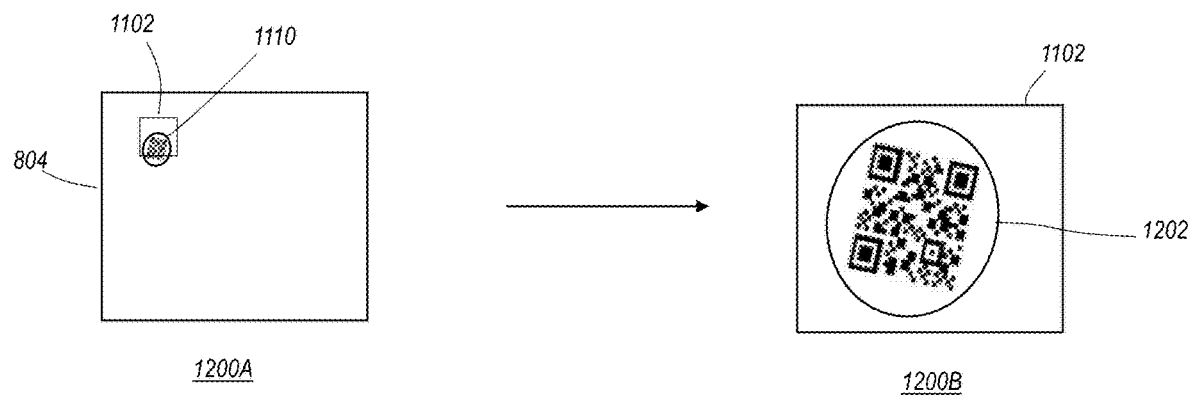
FIG. 12 shows a progression of recognizing a code in a reduced size optical code identifier using a magnifying mask, in accordance with some embodiments.

FIG. 11A shows a series of magnifying mask locations in an automated search in a live image on a mobile device for a reduced size optical code identifier, and FIG. 11B shows various examples of a reduced size optical code identifier appearing in a magnifying mask during an automated zoom search of a live image on a mobile device for pattern recognition, in accordance with some embodiments. In FIG. 10 an example of using manually controlled zoom/magnification was provided. It is further contemplated that an automated zoom search of a live image and be performed using magnification of a portion of the live image. In FIG. 11A there are a series 1100A-1100F of target windows 804 which each correspond to the same region of the output of the mobile device's image sensor data corresponding to a region in the field of view of the camera. The target window 804 can be searched by the application program for patterns that strongly correlate to that of an optical code when the identifier is a long distance from the identifier (e.g. more than 20 times the width/diameter of the optical code) and magnification (zoom) is used to in an automatic process to find and identify/decode an optical code of a reduced size optical code identifier. A magnifying mask 1102 identifies a region of the target window 804 that will be magnified (zoom) and evaluated to determine if a portion of an optical code is likely present. In other words, the region encompassed by the mask is automatically zoomed by the application program in processing, but it is not necessarily displayed as it may cause the user to move the mobile device in response. The mask 1102 is moved to different portions of the target window 804 as indicated by arrows 1106, 1108. The mask can be scrolled across the live image, then returned as indicated by arrow 1104 and shifted downward some amount of pixels, and scanned across the window again. Thus, the process in some examples can commence with the magnifying mask 1102 moving horizontally across the target window 804, and upon reaching the opposite side, shifting the mask vertically (down) and then repeating a horizontal scan. During the scan, at each position, the application program compares the magnified image content to patterns of optical codes to determine if there is a sufficient correlation, as is otherwise commonly done in optical code readers. In FIG. 11B there several examples of portions 1110A-1110C of an optical code falling within the magnifying mask 1102 as it is scanned through the target window 804. These portions are sufficient to correlate with known optical code characteristics that, once identified, the magnifying mask 1102 can be moved to center on the optical code, as shown in FIG. 12. In FIG. 12, in 1200A, the magnifying mask 1102 falls partially over an optical code 1110, which is magnified through zoom, and then the optical code 1110 can then be centered in the magnifying mask 1102 in 1200B, producing a magnified optical code 1202 that can be decoded. In 1200B, once the application program has identified a optical code, it can display an image capture of the optical code in the target window, magnified so as to fill the target window 804, thereby giving visual confirmation to the user that the optical code was detected and decoded so that the user can then move onto other operations related to the optical code, the identifier in which it is located, and the object to which the identifier is attached.

Figure 16A:
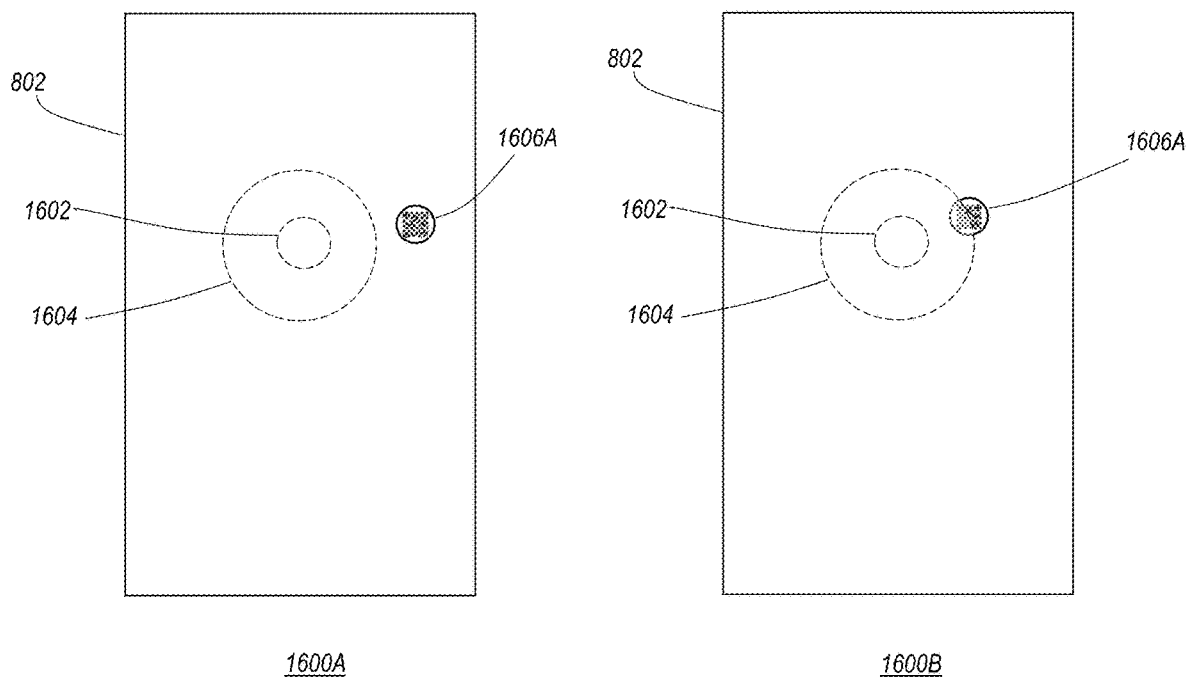
FIGS. 16A and 16B show the use of a stationary magnification mask in a mobile device for recognizing an optical code of a reduced size optical code identifier, in accordance with some embodiments.
Figure 16B:
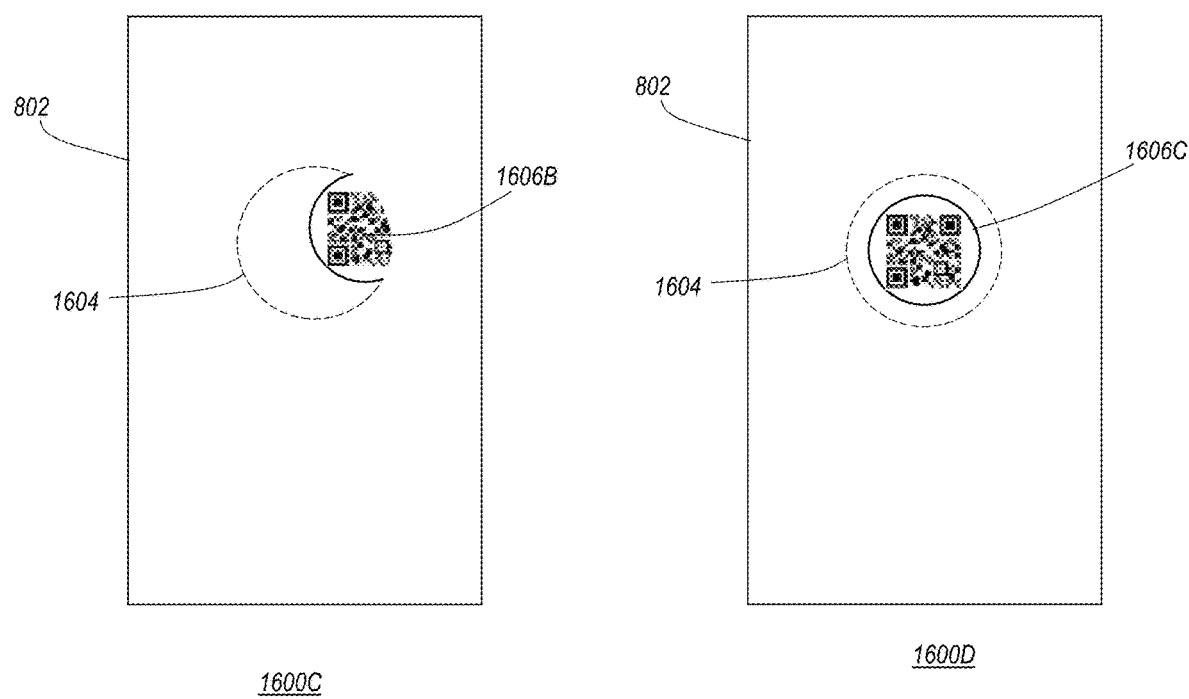

FIGS. 16A and 16B show a further alternative for magnifying an optical code. In both FIGS. 16A and 16B there is shown a progression of using a mobile device to identify and decode an optical code contained on a reduced size optical code identifier at a substantial distance from the identifier. The progression occurs over steps 1600A-1600D. In each step there is shown the graphical display 802 of the mobile device in which a live image is displayed. For the sake of clarity, all objects other than the identifier have been removed from view in these drawings. In general, a portion 1604 of the display 802 is used to magnify a smaller region 1602. Thus, whatever falls in region 1602 in the image sensor data will be magnified to fill region 1604, which also acts as the target window, meaning only what is displayed in region 1604 will be used to search for an optical code, and the rest of the live image in the graphical display will simply be displayed to the user but otherwise ignored by the application program attempting to identify an optical code. In 1600A the identifier 1606A is in the live image presented on the display 804, but outside of the target portion 1604 and the magnified region 1602. In 1600B mobile device has been moved such that the identifier 1606A is partially within the target portion 1604, as indicated by the faded rendering here. In practice, whatever is in the image sensor data corresponding to region 1602 is magnified to fill the target portion 1604 at all times while operated in this particular mode of optical code scanning. In 1600C the mobile device has been moved further, and the identifier is partially in region 1602, resulting in a magnified partial identifier image 1606B in the target portion 1604. This indicates to the user that they must still move the mobile device to bring the entire identifier into view in the target window 1604, which is done in 1600D, where the entire identifier is in the field of view corresponding to region 1602, and is thus magnified to fill the target region 1604, which point the optical code can be recognized and decoded. The user can adjust the level of magnification in some embodiments, which effectively adjust the size of region 1602.

Figure 13:
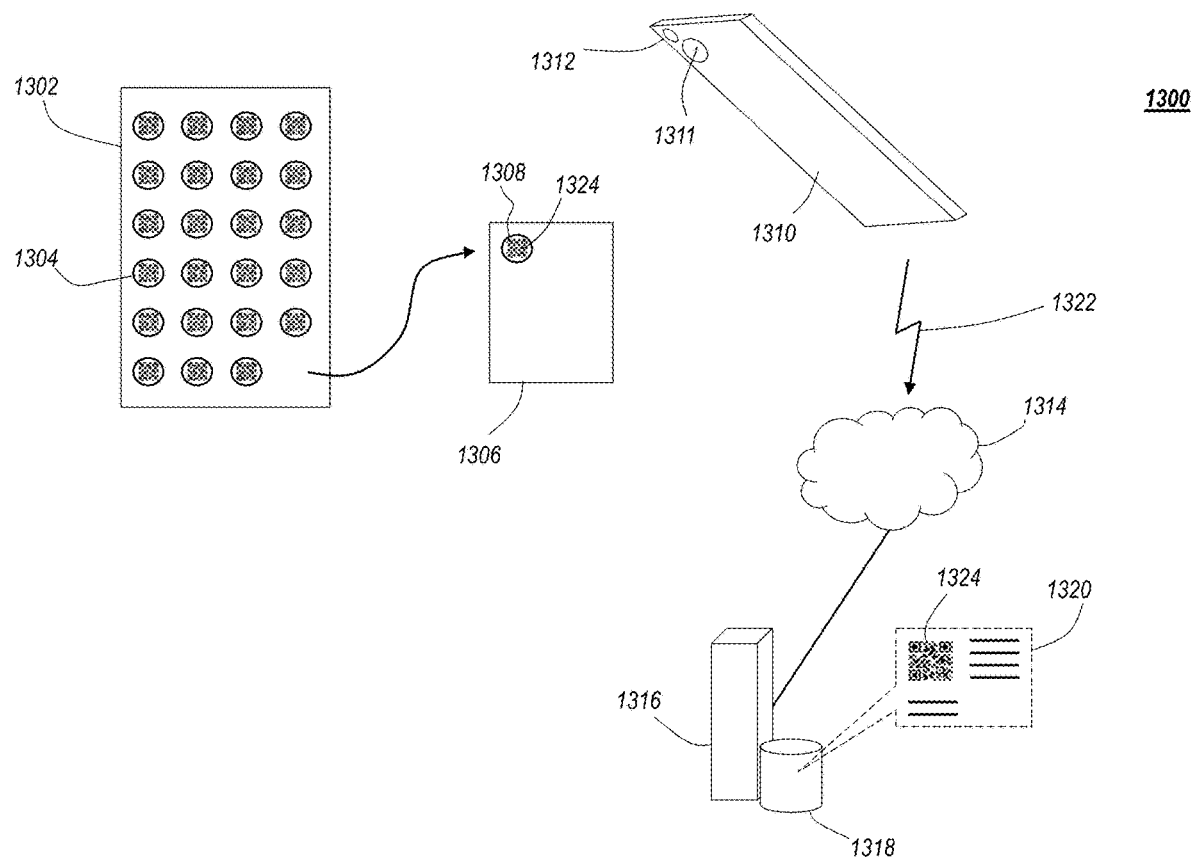
FIG. 13 shows a system for deploying, establishing, and reading reduced size optical code identifiers, in accordance with some embodiments.

FIG. 13 shows a system 1300 for deploying, establishing, and reading reduced size optical code identifiers, in accordance with some embodiments. In some embodiments a user can purchase a sheet 1302 of identifiers 1304. Each of the identifiers can be configured as shown in FIGS. 1 and 2, having a particular size. Each one of the identifiers 1304 includes an optical code that is unique to that particular identifier. The optical code can encode, for example, a uniform resource locator (URL) that includes an identifier number. An exemplary URL could be "www.keycoda.com/00000001." The URL can direct a browser to an internet domain which is the network address of a server 1316 where, for example, "www.keycoda.com" is used by internet domain name servers to direct a browser request to the server 1316, and "00000001" is a serial number used by the server 1316 to reference a record, and the serial number is unique to the particular optical code and identifier being read. The sheet 1302 has a surface that acts as a low tack liner release to the adhesive on the back surface of the identifiers 1304 so that they can be easily removed from the sheet and then affixed to an object 1306.

As a usage example, the user of a mobile device 1310 can install an application program that, among other things, can recognize and decode optical codes, and can also use resources of the mobile device 1310 to access a communication network and communicate with server 1316. The user of the mobile device 1310 can set up an account with the server 1316 that requires authentication to access, as is well known. The user can purchase one or more identifiers or sheets of identifiers. Each one of the identifier having a unique optical code and serial number. The user can then take identifier 1308 and attach it to object 1306. The object 1306 can be any object for which the user wants to store information so that the user, or another entity, can later retrieve that information and be reminded or learn something about the object 1306. To create the record, the user can use the mobile device, running a suitably configured application program, to recognize the optical code of the identifier 1308 using any of the previously described techniques or an equivalent, and using the camera 1311 and light 1312. The application program, upon recognizing the optical code, can either prompt the user indicate if they want to create a new record or retrieve and view/edit an existing record. Alternatively, the application program can transmit the serial number to the server 1316, and if there is no record, the server will indicate such to the mobile device and in response the application program will initiate a record creation interface on the mobile device. Communication can be conducted by the mobile device establishing a wireless link 1322 to a terrestrial network 1314 that can include the Internet, as well as any other communication resources (e.g. access points, cellular base stations, etc.).

Once the user is prompted to create a record, the user can enter relevant information of the object 1306 as text into the mobile device 1310, which then transmits the information to the server 1316 with the serial number of the identifier 1308. The server 1316 then stores the information in a database or data store 1318 creating a record 1320 that includes the serial number 1324 of the identifier 1308 as encoded in the optical code of the identifier 1306. The record 1320 is further associated with the user's account. Accordingly, only the user can access the record 1320 by providing authorization credentials to the server 1316, either directly (e.g. through a browser), or through the application program on the mobile device (i.e. the application program relays the credentials). At any time thereafter, the user, or another authorized entity can access the record and using a mobile device to read the optical code on the identifier 1308, and having the server 1316 fetch and return the record 1302 to the mobile device for display to the user. The user can, as mentioned, also edit or update the record 1320.

Figure 14:
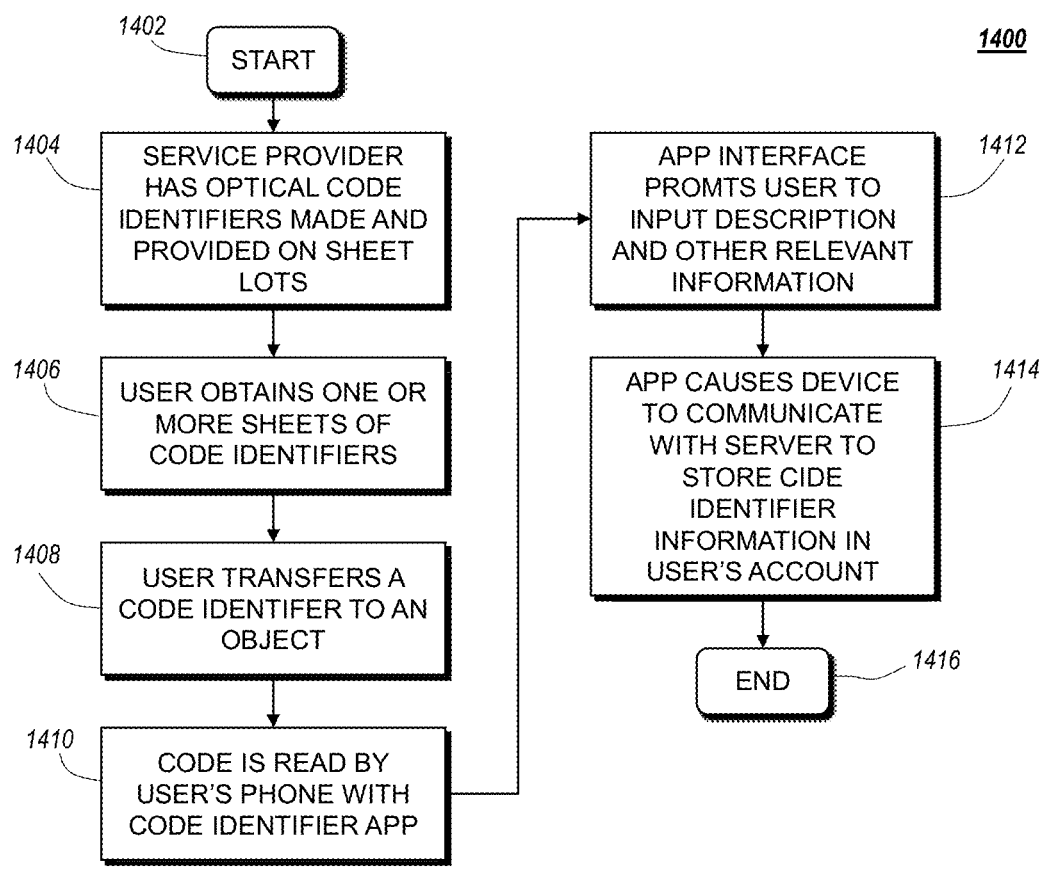
FIG. 14 shows a flowchart diagram of a method for associating and storing information with a code that is encoded in an optical code in a reduced size optical code identifier, in accordance with some embodiments.

FIG. 14 shows a flowchart diagram of a method 1400 for associating and storing information with a code that is encoded in an optical code in a reduced size optical code identifier, in accordance with some embodiments. At the start 1402 the user has a computing device such as a mobile device that has an application program designed in accordance with the disclosure herein instantiated on the computing device to facilitate optical code recognition and communication with a server for storing information associated with an optical code. In step 1404 a manufacturer or service provider who operates the server has provided one or more reduced size optical code identifiers to the user, such as on a sheet as shown in FIG. 13. Each one of the reduced size optical code identifiers is given a unique serial number by the manufacturer. The reduced size optical code identifiers can be, in some embodiments, purchased through a service that operates the server (e.g. 1316), and are associated with the user/purchaser's account to ensure they cannot be used with any other account. In step 1406 the user has obtained one or more reduced size optical code identifiers, such as on a sheet of reduced size optical code identifiers, each having a unique code encoded thereon that is optically recognizable and readable. In step 1408 the user can remove one of the identifiers from the sheet and apply it to an object for which an identification record will be created. In step 1410 the user uses their computing device to read the identifier, which the application program uses to communicate with the server and create a record for the object in step 1412. The application program can prompt the user to enter information. The prompt can be a general prompt providing a text box in which the user enters whatever information they want, or the prompt can be a form with defined fields for particular applications, such as keys. In step 1414 the application program then transmits the information to the server, and the server creates a record and updates an index in order to cross reference the serial number encoded on the identifier with the record thereafter. In step 1416 the method can end, but steps 1408-1414 can be repeated with other identifiers/objects. Further, step 1408 can be performed before, during, or after performing steps 1410-1414.

Figure 15:
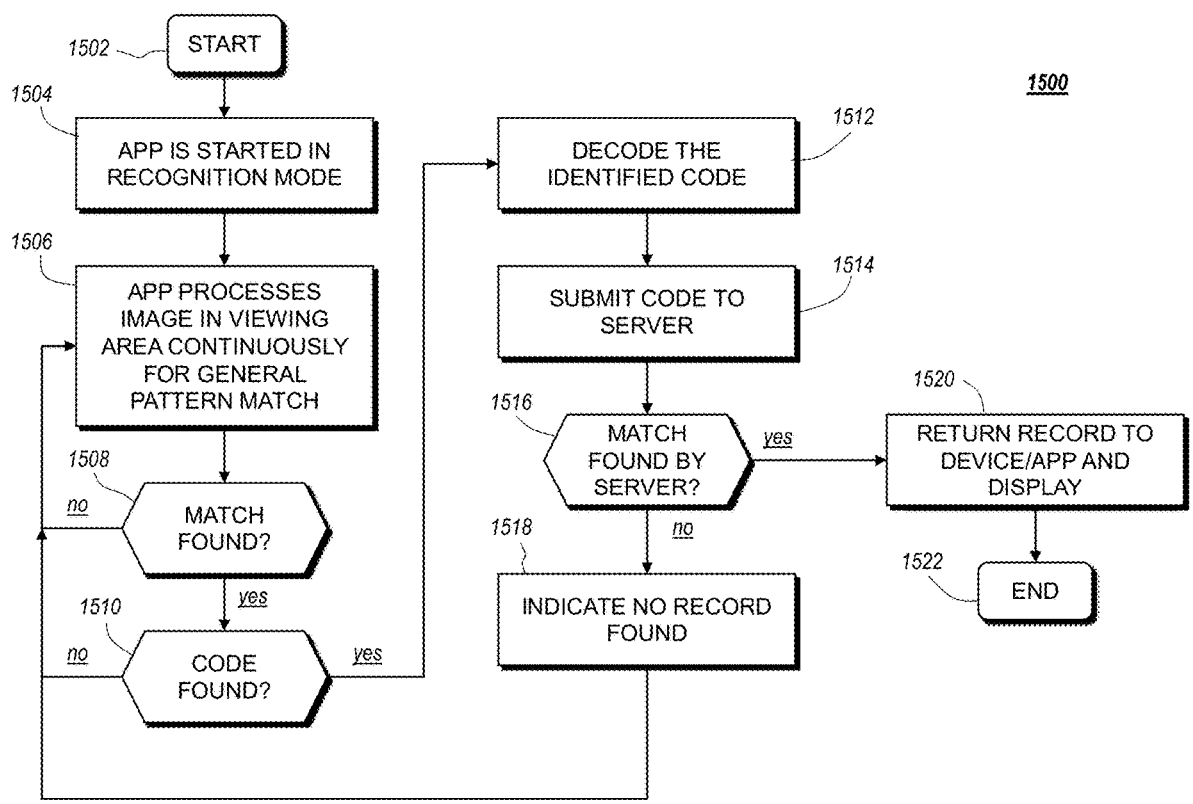
FIG. 15 shows a flow chart diagram of a method of reading an optical code and fetching information associated with the optical code, in accordance with some embodiments.

FIG. 15 shows a flow chart diagram of a method 1500 of reading an optical code and fetching information associated with the optical code, in accordance with some embodiments. At the start 1502, the user has an object having a reduced size optical code identifier. In order to obtain information about the object, the user can start an application program on a computing device that is configured to optically identify and recognize the identifier, and then read the optical code and transmit either the code or a decided serial number to server. Thus, in step 1506 they user aims the camera of the computing device at the object and identifier. The application program scans the image data produced by the camera system to look for patterns that match an optical code, generally. In step 1508, if a match is found, then the method proceeds to step 1510 but can otherwise continue looking for a match. Likewise, in step 1510, the application program determines if an optical code can be recognized. If so, then in step 1512 the optical code is decoded, or otherwise obtained to submit to the server in step 1514. Upon receiving the code, or a decoded serial number, the server then attempts to cross reference the received information with a record in the database or data store. When there is a match, in step 1516, then the server in step 1520 returns the record for display to the user and the method ends 1522. However, if the server cannot cross reference the received information with a record, or if the record belongs to an account that the user has not provided credentials to access, the server will return the equivalent of a "no record found" message to the user. This prevents users from access records they are not authorized to access.

The disclosed embodiments provide the advantage of providing small, machine readable optical code identifiers in a durable package that is domed, having tapered edges that resist being caught or bumped, and having a non-glossy finish to reduce reflection and allow both near and far reading of the optical using macro lens operation as well as zoom lens functions on common mobile device camera systems. The optical code identifiers can be used to archive information about an object by adhering an optical code identifier having a unique optical code therein on the object. The unique optical code is then associated with an electronic record in which a user can write and store information, and restrict access to the information for security purposes, if desired. The packaging for optical code identifiers disclosed herein allow numerous applications that have not been practical with conventional optical code marking, such as painting or printing an optical code on a surface, which is then subjected to wear and weathering. The disclosed optical code identifier provide an excellent solution to use in outdoor locations where minimizing the size of an optical code is desirable. For example, the optical code identifiers disclosed herein can be used in parks on markers for scenic features, map points, etc. These are outdoor locations that are subject to weathering and wear, which could cause a printed or painted optical code to degrade over time.

The claims appended hereto are meant to cover all modifications and changes within the scope and spirit of the present invention.

What is claimed is:

1. A reduced size optical code identifier, comprising:
    a body having a back surface and a top surface, the back surface being flat and planar and having a perimeter,
    the top surface extends over the body and generally has a domed shape and meets the bottom surface at the perimeter around an entirety of the perimeter;
    the body being made of a transparent material, with the top surface being anti-reflective;
    a visual code disposed in the body adjacent the bottom surface and facing toward the top surface; and
    wherein the body has a distance across the bottom surface, from one side to a directly opposite side, that is not more than twelve millimeters.

2. The reduced size optical code identifier of claim 1, wherein the top surface is matte.

3. The reduced size optical code identifier of claim 1, wherein the bottom surface is circular.

4. The reduced size optical code identifier of claim 3, wherein the bottom surface has a diameter of about four millimeters, and the body is about one millimeter thick at a middle of the body from top surface to the bottom surface.

5. The reduced size optical code identifier of claim 4, wherein the visual code is disposed in a square having sides of about three and half millimeters and centered over the bottom surface.

6. The reduced size optical code identifier of claim 4, wherein the top surface is a spherical segment centered over the bottom surface and having a radius of about six millimeters.

7. The reduced size optical code identifier of claim 1, further comprising a layer of adhesive disposed on the bottom surface of the body.

8. The reduced size optical code identifier of claim 1, wherein the top surface meets the bottom surface around the perimeter of the bottom surface at an angle of forty five degrees or less.

9. A reduced size optical code identifier, comprising:
a body having a back surface and a top surface, the back surface being planar and having a perimeter,
the top surface extends over the body and meets the bottom surface at the perimeter of the back surface around an entirety of the perimeter of the back surface;
the body being made of a transparent material, with the top surface having an anti-reflective treatment;
an optical code disposed inside the body adjacent the back surface and facing toward the top surface.

10. The reduced size optical code identifier of claim 9, wherein the top surface is non-glossy.

11. The reduced size optical code identifier of claim 9, wherein the back surface is circular.

12. The reduced size optical code identifier of claim 11, wherein the back surface has a diameter of about four millimeters, and the body is about one millimeter thick at a middle of the body from top surface to the back surface.

13. The reduced size optical code identifier of claim 12, wherein the visual code is disposed in a square having sides of about three and half millimeters and centered over the back surface.

14. The reduced size optical code identifier of claim 12, wherein the top surface is a spherical segment centered over the back surface and having a radius of about six millimeters.

15. The reduced size optical code identifier of claim 9, wherein the back surface has a maximum length from one side to an opposite side of twelve millimeters and a minimum length of four millimeters.

16. The reduced size optical code identifier of claim 9, further comprising a layer of adhesive disposed on the back surface of the body.

17. The reduced size optical code identifier of claim 9, wherein the top surface meets the back surface around the perimeter of the back surface at an angle of forty five degrees or less.

18. A reduced size optical code identifier, comprising:
a body having a back surface and a top surface, the back surface defining a plane and having a perimeter;
the body being made of a transparent material, with the top surface having an anti-reflective treatment; and
an optical code disposed inside the body, adjacent the back surface and facing toward the top surface.

19. The reduced size optical code identifier of claim 18, wherein the top surface is domed and extends to the perimeter of the back surface around an entirety of the perimeter of the back surface.

20. The reduced size optical code identifier of claim 18, wherein the optical code is disposed at the back surface in a plane adjacent the plane of the back surface.

* * * * *